United States Patent
Tossavainen et al.

(10) Patent No.: US 11,937,554 B2
(45) Date of Patent: Mar. 26, 2024

(54) METHOD AND ARRANGEMENT TO CONTROL THE OPERATION OF A WOOD-HANDLING DEVICE IN A WORK MACHINE, AND A FOREST MACHINE

(71) Applicant: PONSSE OYJ, Vieremä (FI)

(72) Inventors: Jukka Tossavainen, Vieremä (FI); Terho Tanskanen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 1296 days.

(21) Appl. No.: 16/476,365

(22) PCT Filed: Jan. 9, 2018

(86) PCT No.: PCT/FI2018/050013
§ 371 (c)(1),
(2) Date: Jul. 8, 2019

(87) PCT Pub. No.: WO2018/130747
PCT Pub. Date: Jul. 19, 2018

(65) Prior Publication Data
US 2019/0373826 A1    Dec. 12, 2019

(30) Foreign Application Priority Data
Jan. 10, 2017 (FI) ...................................... 20175016

(51) Int. Cl.
*A01G 23/00* (2006.01)
*A01G 23/083* (2006.01)
(Continued)

(52) U.S. Cl.
CPC ......... *A01G 23/006* (2013.01); *A01G 23/083* (2013.01); *B66C 1/585* (2013.01);
(Continued)

(58) Field of Classification Search
CPC .. A01G 23/006; A01G 23/043; A01G 23/083; A01G 23/003; B66C 15/045;
(Continued)

(56) References Cited

U.S. PATENT DOCUMENTS 4,353,424 A    10/1982   Schenck et al.
10,598,511 B2 *  3/2020   Inberg ...................... B60D 1/62
(Continued)

FOREIGN PATENT DOCUMENTS

BR    PI0608864 A2    2/2010
CA    2933804 A1    12/2016
(Continued)

OTHER PUBLICATIONS

Russian Search Report in related Russian Patent Application No. 2019125149, date of completion of the search Apr. 7, 2021, 4 pages with English Translation.
(Continued)

Primary Examiner — Glenn F Myers
(74) Attorney, Agent, or Firm — FISHERBROYLES, LLP; Robert Kinberg (57) ABSTRACT

A method for controlling operation of a wood-handling device in a work machine. The wood-handling device is attached through a rotation device to an end of a set of booms of the work machine to create a desired orientation of the wood-handling device for the operation. The orientation of the wood-handling device using the rotation device is tied on the basis of the operation to be performed using the set of booms. The orientation of the wood-handling device is tied to the position of the end of the set of booms. The position of the end of the set of booms is defined while performing the operation, on the basis of the position of the end of the set of booms. The wood-handling device is oriented using the rotation device, according to the said tie.

21 Claims, 7 Drawing Sheets (51) Int. Cl.
- *B66C 1/58* (2006.01)
- *B66C 1/68* (2006.01)
- *B66C 13/08* (2006.01)
- *B66C 13/18* (2006.01)
- *E02F 3/43* (2006.01)

(52) U.S. Cl.
CPC .............. *B66C 1/68* (2013.01); *B66C 13/085* (2013.01); *B66C 13/18* (2013.01); *E02F 3/438* (2013.01)

(58) Field of Classification Search
CPC .. B66C 1/585; B66C 1/68; B66C 1/28; B66C 1/30; B66C 1/42; B66C 13/18; B66C 13/085; E02F 3/404; E02F 3/438
See application file for complete search history.

(56) References Cited

U.S. PATENT DOCUMENTS

| | | | |
|---|---|---|---|
| 2010/0223008 A1* | 9/2010 | Dunbabin | E02F 9/262 701/301 |
| 2012/0263566 A1* | 10/2012 | Taylor | E02F 3/437 701/50 |
| 2014/0178166 A1 | 6/2014 | Andruch, III et al. | |
| 2015/0308070 A1* | 10/2015 | Deines | E02F 3/434 701/50 |
| 2015/0353328 A1 | 12/2015 | Palmroth et al. | |
| 2016/0054739 A1 | 2/2016 | Palmroth et al. | |

FOREIGN PATENT DOCUMENTS

| | | |
|---|---|---|
| CN | 1291961 A | 4/2001 |
| CN | 201022289 Y | 2/2008 |
| CN | 101573026 A | 11/2009 |
| CN | 201781826 U | 4/2011 |
| CN | 103362153 A | 10/2013 |
| CN | 104363754 A | 2/2015 |
| CN | 105339292 A | 2/2016 |
| DE | 3913499 A1 | 10/1990 |
| EP | 0512584 A2 | 11/1992 |
| EP | 1889537 A2 | 2/2008 |
| EP | 2116128 B1 | 10/2011 |
| EP | 2719274 A1 | 4/2014 |
| EP | 2987399 A1 | 2/2016 |
| FI | 20155486 A | 12/2016 |
| RU | 2429363 C2 | 9/2011 |
| RU | 2463776 C2 | 10/2012 |
| WO | 2016099372 A1 | 6/2016 |

OTHER PUBLICATIONS

Löfgren, Kinematic Control of Redundant Knuckle Booms with Automatic Path-Following Functions, Doctoral Thesis, Stockholm: [online], Nov. 9, 2009, 171 pages, ISBN 978-91-7415-513-6.

Finnish Office Action in Corresponding Finnish Patent Application No. 20175016, dated May 16, 2022, 14 pages with English Google Translation.

Finnish Opinion on Patentability in related Finnish Patent Application No. 20175016, dated Nov. 12, 2019, 13 pages with English Translation.

Chinese Search Report in related Chinese Patent Application No. 2018800065322, dated Jan. 16, 2021, 6 pages with Google English Translation.

Chinese Search Report in corresponding Chinese Patent Application No. 2018800065322, dated Jul. 14, 2021, 4 pages with Google English Translation.

International Search Report of PCT/FI2018/050013 dated Apr. 6, 2018.

Written Opinion of PCT/FI2018/050013 dated Apr. 6, 2018.

\* cited by examiner

METHOD AND ARRANGEMENT TO CONTROL THE OPERATION OF A WOOD-HANDLING DEVICE IN A WORK MACHINE, AND A FOREST MACHINE

CROSS-REFERENCE TO RELATED APPLICATIONS

This application is a U.S. National Stage Application of International Patent Application No. PCT/FI2018/050013, filed Jan. 9, 2018, which claims benefit of Finland Patent Application No. 20175016, filed Jan. 10, 2017.

BACKGROUND OF THE INVENTION

The invention concerns to a method for controlling the operation of a wood-handling device in a work machine, which wood-handling device is attached through a rotation device to the end of the set of booms of the work machine in order to create the desired orientation of the wood-handling device for the operation and in which method the orientation of the wood-handling device performed using the rotation device is tied on the basis of an operation to be performed using the set of booms. In addition, the invention also relates to a corresponding arrangement and a forest machine.

A forest machine typically includes a lifting device comprising a set of booms, a pivoted joint, and a rotation device. A tree-handling device can be attached to the rotation device, such as, for example, a grab, a grapple, or a harvester head for handling trees, or correspondingly some other work device for handling other loads.

By means of the rotation device, the forest-machine driver orientates the tree-handling device in the correct direction for the operation by rotating it to a suitable attitude relative to the vertical axis defined by the axial direction of the rotation device. The attitude is determined from the operation to be performed using the set of booms at the time and also from the position of the work machine and the attitude of the set of booms relative to the operation to be performed. One typical example of this is the unloading and loading of a load formed of timber goods cut to one or more lengths. In both, the grab is rotated to a suitable attitude at both ends of the path of movement of the set of booms, in the load space and in the area of the heap/stack. In connection with the load space, the grab is to be oriented in such a way that the trees to be taken to the load space in grab are parallel to the longitudinal direction of the load space, or the attitude of the grab is such that it can be used to pick trees out of the load space. In connection with a stack or heap, the grab is to be oriented according to a corresponding principles in such a way that the grab can be used to place trees in a stack or pick them from the stack or heap, the movement of the jaws of the grab taking place on a plane that is mainly perpendicular relative to the longitudinal direction of the pieces of timber being in the stack or heap.

The location and orientation of a forest machine relative to a stack when loading or unloading is typically such that the forest machine is located next to the stack on the side of the ends of the trees. Due to such an arrangement, the grab must be reorientated every time when unloading and loading, both over the stack and also over the load space. Due to the repeated control operations, this makes the forest machine's driver's work routine, but it also demands precision.

A solution is known from European patent application publication EP2987399, in which the operation of the rotation device is controlled by detecting the direction and/or speed of movement of the end of the boom. This makes the implementation demanding and also contains ponderous computation. In addition, this takes little account of the fact that, due to the working environment, the paths and directions of movement of the crane are not necessarily always the most straight and optimal. Thus, an implementation based on the direction and/or speed of the boom end also increases the fuel consumption of the work machine. In addition, a solution is known from publication EP2116128, which comprises a sensor in the crane for determining the distance of the crane end and/or the angles between the booms.

The intention of the present invention is to create a method and arrangement for controlling the operation of a tree-handling device in a work machine, which permits the use of a lighter device and software implementation for the easier orientation of a tree-handling device in connection with operations performed using the set of booms. According to one embodiment of the invention, there is provided a method for controlling an operation of a wood-handling device in a work machine, which wood-handling device is attached through a rotation device to an end of a set of booms of the work machine to create a desired orientation of the wood-handling device for the operation, the method comprising the steps of: tying the orientation of the wood-handling device performed using the rotation device on the basis of the operation to be performed using the set of booms and the position of the end of the set of booms; defining the position of the end of the set of booms while performing the operation; and orienting the wood-handling device using the rotation device according to the tying step.

According to another embodiment of the invention there is provided an arrangement for controlling an operation of a wood-handling device in a work machine, comprising: a set of booms attached to the work machine; operating devices for handling of trees by the work machine, arranged to change the position of an end of the set of booms; a wood-handling device attached to the end of the set of booms through a rotation device for creating a desired orientation in the wood-handling device for the operation; a position determining sensor to determine the position of the end of the set of booms and the orientation of the wood-handling device relative to the work machine when performing the operation; and a control means for tying the orientation of the wood-handling device performed using the rotation device on the basis of the operation to be performed using the set of booms and the position of the end of the set of booms and for orienting the wood-handling device using the rotation device according to the tying.

By tying the orientation of the tree-handling device with the position of the end of the set of booms, by determining the position of the end of the set of booms when performing an operation, and by orienting the tree-handling device using the rotation device on the basis of the position of the end of the set of booms according to the tying, the tree-handling device can be oriented without substantial operator interaction by means of a light software-level implementation. Thus, the invention does not require predictive and thus complex computation. It accelerates the operation of the forest machine. In addition, the invention can be implemented with known sensoring. In addition, the invention can also be used to avoid the essentially continuous orientation of the tree-handling device and thus orientate the tree-handling device more energy-efficiently.

According to one embodiment, the orienting of the tree-handling device is tied to the position of the end of the set of booms in one or more positions of the end of the set of booms, preferably, for example, by the action of the work machine's operator. Most advantageously, the operator only needs to program the orienting of the tree-handling device once before starting the operation to be performed using the set of booms when starting work.

According to one embodiment, before the operation to be performed using the set of booms, the orientation of the wood-handling device corresponding to the position of the end of the set of booms is tied for repeating the operation performed using the set of booms in at least two positions of the end of the set of booms, preferably by recording in the memory of the work machine's control system the orientation of the wood-handling device in at least two positions of the end of the set of booms. According to one embodiment, these two positions are points or areas in connection with the end points of the path of movement of the set of booms. Examples of these positions are the positions of the end of the set of booms in the area of the load space and the stack, more generally in the target area, target point, and/or target space. According to one embodiment, in addition to the mainly automatic orienting of the wood-handling device, the movement of the set of booms, for example, in the case of the pivots, can also be stored, in order to guide the set of booms along the stored path of movement.

Owing to the invention, the rotation device fitted to the end of the set of booms orientates the wood-handling device by rotating it to a specific attitude, for example, a pre-stored attitude, on the basis of the momentary position of the end of the set of booms or future position of the end of the set of booms. Owing to the invention, the rotation device is rotated when necessary or when it is, for example, most advantageous in terms of energy consumption (the rotation device has a low energy consumption). The invention permits, better than the prior art, such as, for example, control based on the movement of the set of booms, taking into account crane's various paths of movement that deviate from one another when performing even repeated operations in the automatic orientation of the wood-handling device. Owing to the invention, the orienting of the wood-handling device can preferably take place only when it is in the target area/at the target point/in the target space. In this way, i.e. by avoiding the continuous orienting of the wood-handling device performed on the basis of the direction of movement of the boom end, savings are made, for example, in the fuel consumption of the work machine.

By means of the method according to the invention, it is possible to automate or semi-automate the rotation of the rotation device according to the work situation or the location of the end of the set of booms or of the wood-handling device. In semi-automation the work machine operator guides the set of booms by using the end of the set of booms and the location of the wood-handling device, in which case the control system in turn guides the orientation of the wood-handling device according to the location of the end of the set of booms. Correspondingly, in another form of semi-automation the work machine operator can participate to make the orienting more precise, when the automation first of all takes care of the rotation of the rotation device, i.e. the pre-orientation of the wood handling device. By means of the invention, an often repeated movement can be automated and thus the work machine operator's work can be facilitated and also made more efficient. Other characteristic features of the invention are stated in the accompanying Claims and additional advantages achieved by it are itemized in the description portion.

BRIEF DESCRIPTION OF THE DRAWINGS

In the following, the invention, which is not restricted to the embodiments presented in the following, is described in greater detail with reference to the accompanying figures, in which.

DETAILED DESCRIPTION OF THE INVENTION

Figure 1:
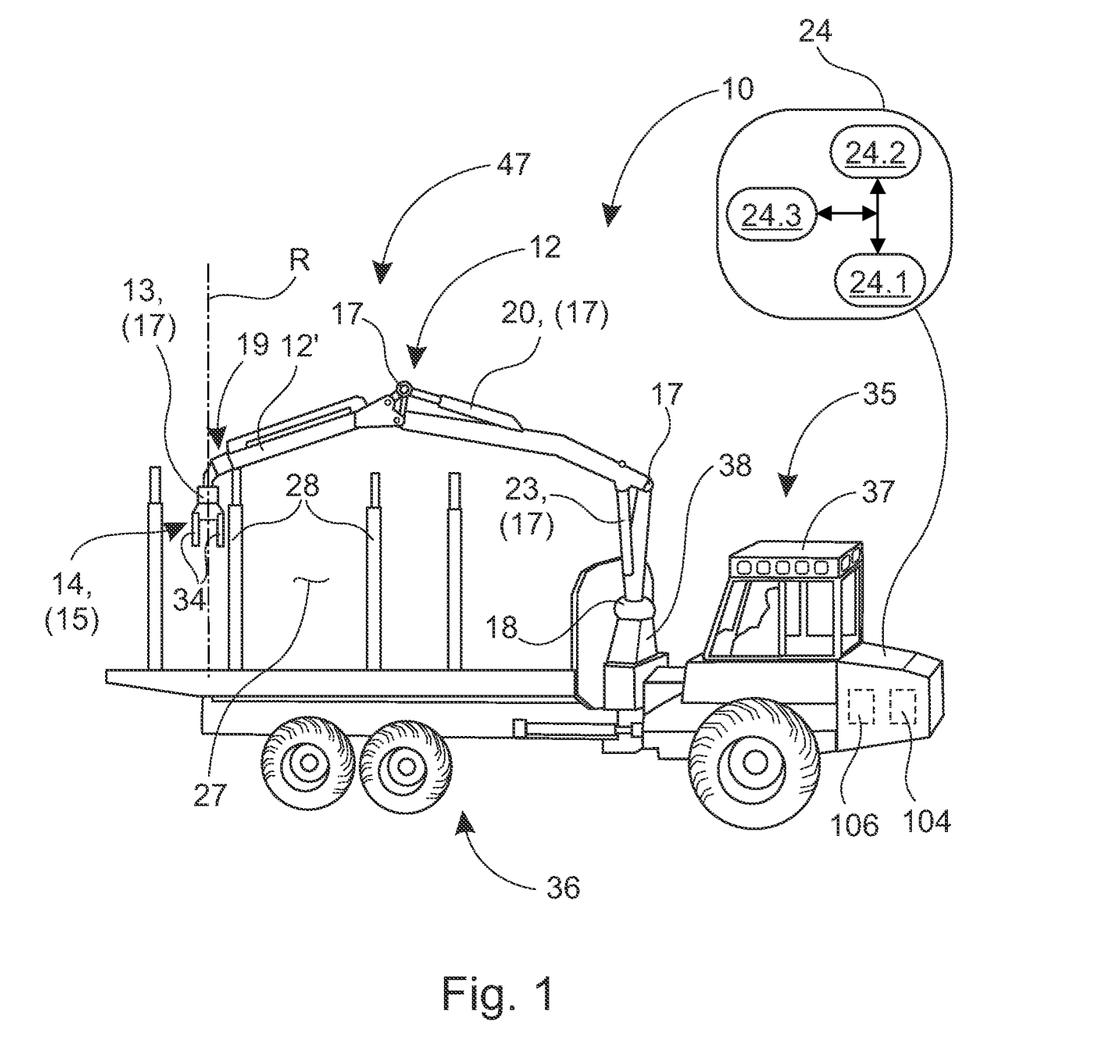
FIG. 1 shows a simplified schematic diagram of an example of a forest machine, in which the invention can be applied.

FIG. 1 shows a simplified schematic diagram of a work machine 10, in which the method and arrangement according to the invention can be applied. A forest machine 100, and even more particularly a forwarder is now shown as the work machine 10. The forwarder includes, in an as such known manner, for example, a chassis of two parts pivoted together. In the front carriage 35 there is a cab 37 and engines 104 and in the load carriage 36 a load space 27. The load space 27 is delimited on both sides by the load stakes 28 i.e. the bunks. It is possible to transport, for example, trees 16 felled, stripped, and cut by a multi-purpose machine, or forest waste, such as tops and branches, in the load space 27.

The forwarder also includes, in an as such known manner, a crane 47 located, for example, between the cab 37 and the load space 27. The base 38 of the crane 47 can be preferably situated on the load carriage 36, or on the other hand the crane 47 can be situated on top of the pivot between the carriages, or on the front carriage 35. The crane 47 is formed, in an as such known manner, of a set of booms 12, in which there can be several booms pivoted to each other. At the end 19 of the outermost boom 12' of the crane's 47 set of booms 12 there is in turn a wood-handling device 14, which in this case is a grab 15. Instead of a grab, it is also possible to speak of grapple.

Using the grab 15 goods, in this case trees 16, are lifted into the forwarder's load space 27 for transportation and correspondingly the goods are also lifted out of the load space 27 to unload the forwarder. In the grab 15 there are operating devices, which operate the jaws 34 that are rotatably pivoted to it and which move backwards and forwards relative to each other. Between the grab 15 and the set of booms 12 is a rotation device 13, i.e. a rotator, for rotating the grab 15 and even more generally the wood-handling device 14. The rotation device 13 is attached to the end 19 of the set of booms 12 by a pivot. The pivoted joint can be implemented using a so-called shackle, which is between the end 19 of the set of booms 12 and the rotation device 13. The shackle permits the rotation device 13 and the wood-handling device 14 attached to it to hang mainly freely.

Preferably the typical shackle comprises two rotating joints transversely perpendicular to each other, which permits the wood-handling device 14 to hang freely and mainly vertically, independently of the attitude of the set of booms 12. It should be noted that the movements of the set of booms 12 and the work machine 10 then make the wood-handling device 14 swing on the shackle. It should also be noted that, though the wood-handling device 14 is described as hanging freely, shackles typically also comprise a brake, a swing brake, which is intended to damp the swinging of the shackle and the wood-handling device 14, particularly when there is a load in the grab 15. Damping swinging accelerates work with the work machine 10. In addition, the risk of damage due to impacts caused by the swinging, for example to the body of the work machine 10, is reduced.

The wood-handling device 14, for example the loader grab now shown here, is attached to the rotation device 13, which is also very generally referred to as a rotator. The wood-handling device 14 can be rotated with the aid of the rotation device 13 around the axis of rotation of the rotation device 13, preferably limitlessly around the axis of rotation R of the rotation device 13. Thus the wood-handling device 14 is attached to the end 19 of the set of booms 12 of the work machine 10 through the rotation device 13 in order to create the desired orientation for the wood-handling device 14 for operation. The operation can be, for example, moving a load, in this case trees 16 from one place to another. The rotation device 13 and also the wood-handling device 14 get their operating power, for example, from a pressure-medium flow. This can be brought through the set of booms 12 with the aid of hoses, more generally pressure-medium lines from the forest machine's 100 pressure-medium pump 106. The pressure-medium pump 106 is rotated, for example with the aid of the forest machine's engine 104, in order to create pressure.

In this connection, it should also be understood that, in addition to a forest machine 100, the method and arrangement according to the invention are also suitable for use, for example in excavators and other work machines equipped with a set of working booms, in which a tool is attached to the set of working booms through a rotation device 13.

Figure 2:
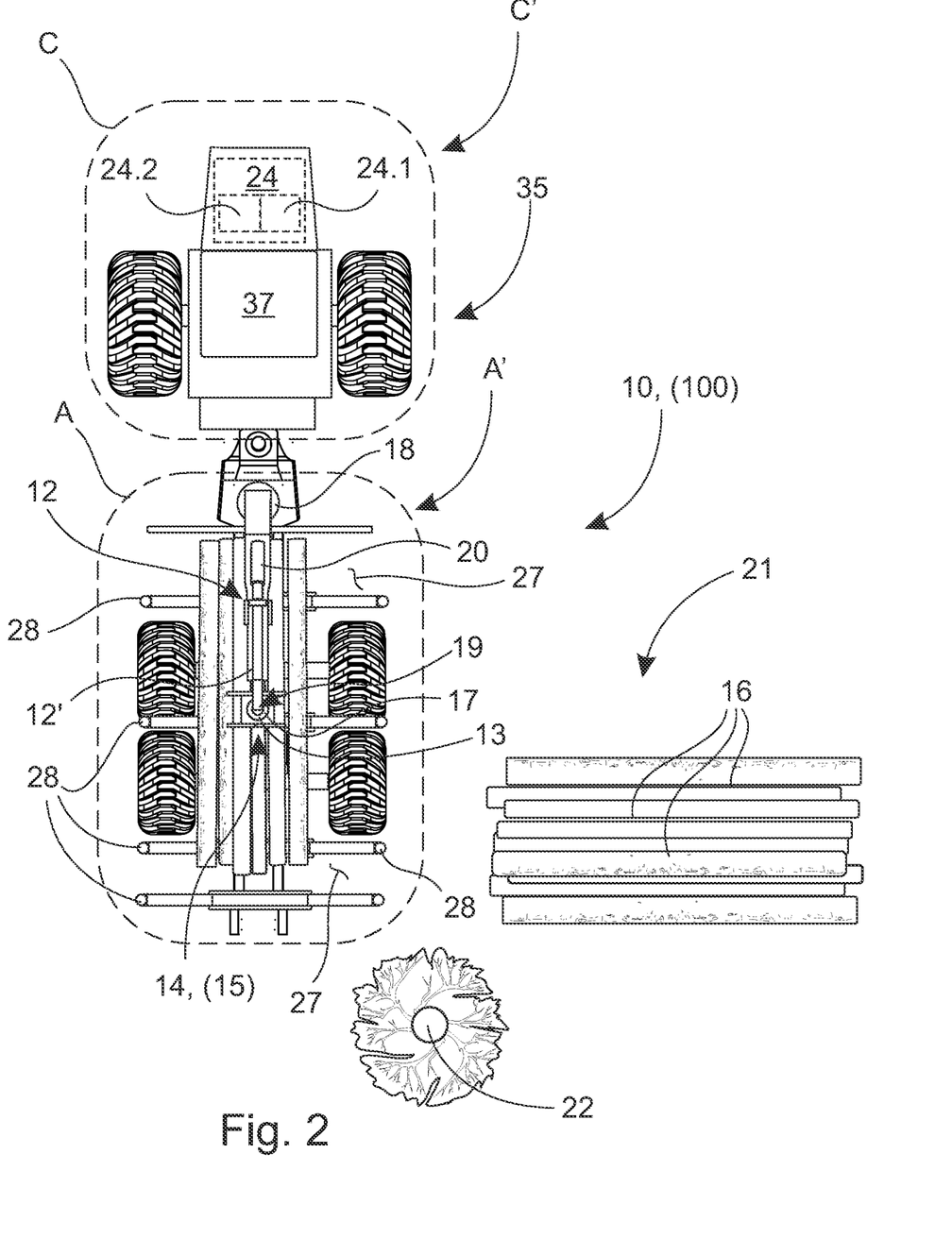
FIGS. 2 and 3 show a schematic top view of the stages of the method according to the invention.
Figure 3:
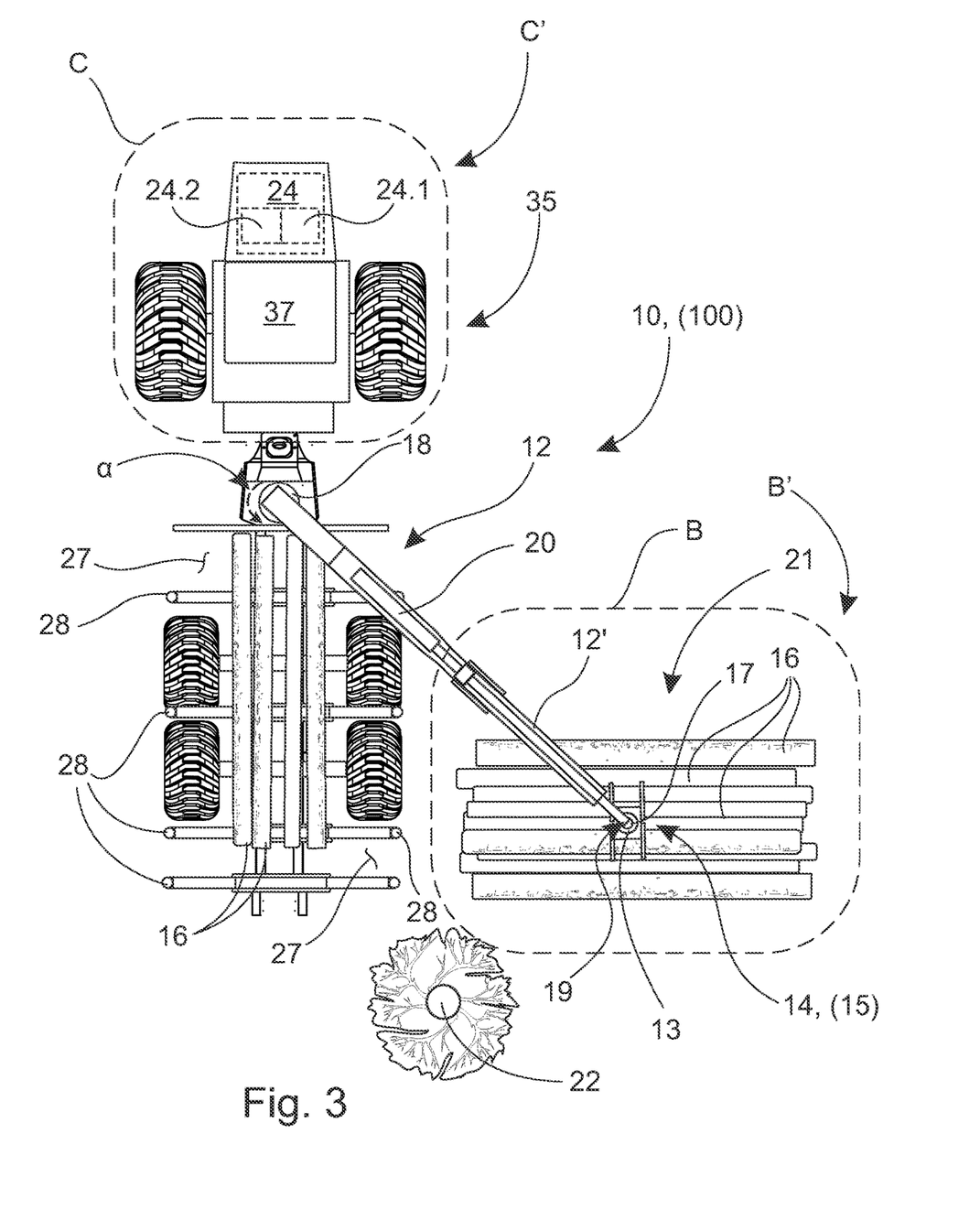
Figure 6:
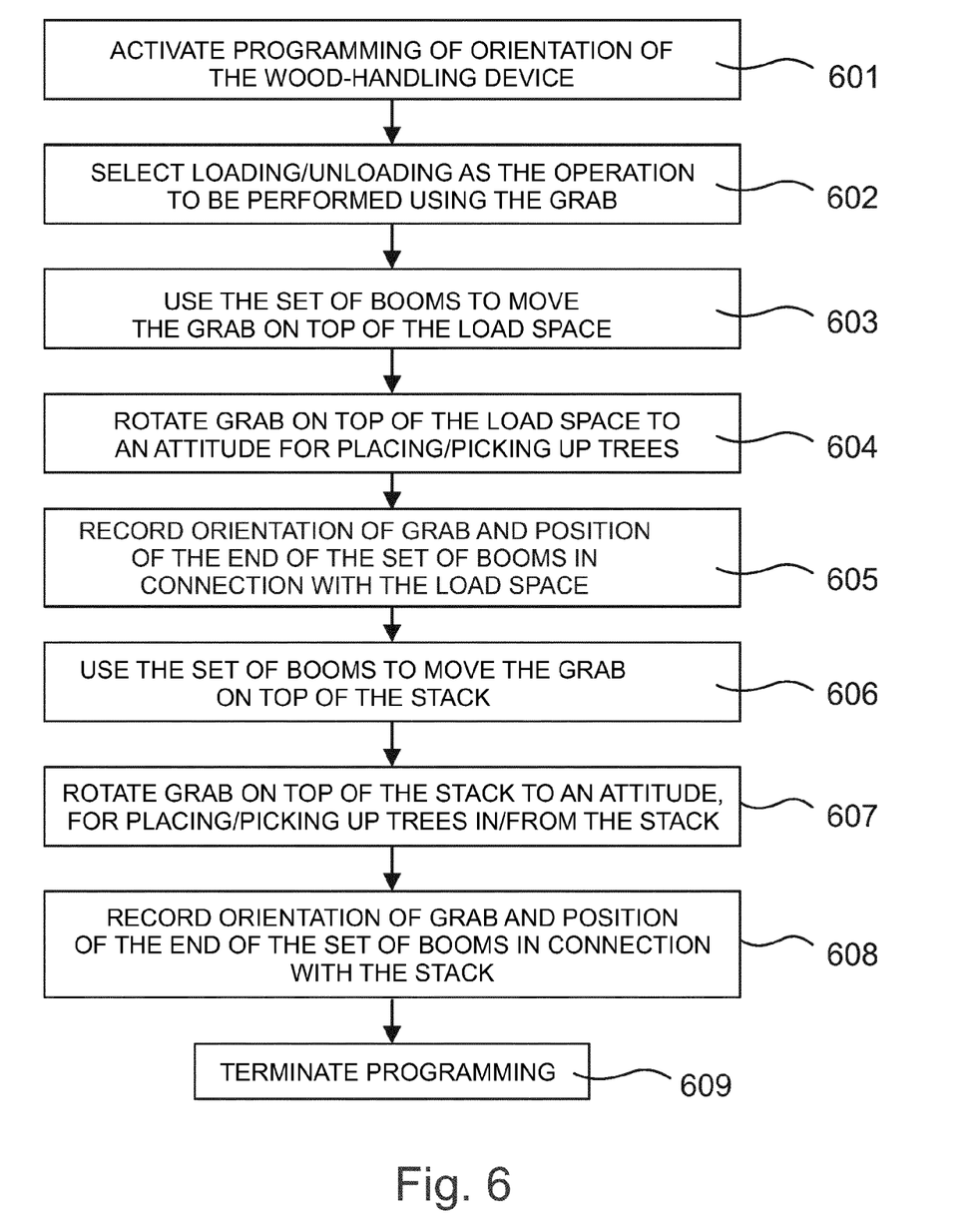
FIG. 6 shows a flow diagram of an example of the method when programming the orientation of the wood-handling device.
Figure 7:
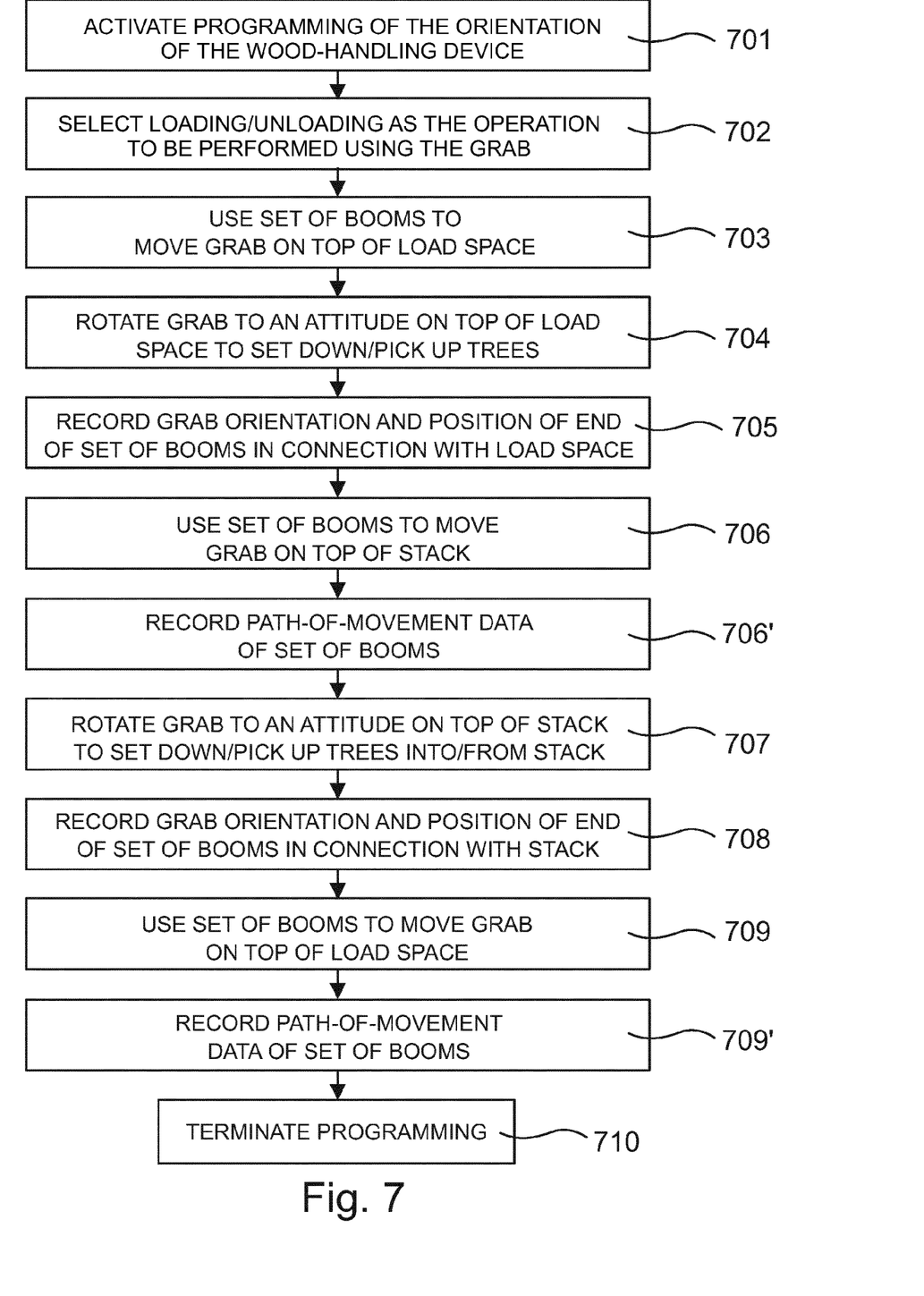
FIG. 7 shows a flow diagram of a second example of the method when programming the orientation of the wood-handling device and the path of movement of the set of booms.
Figure 8:
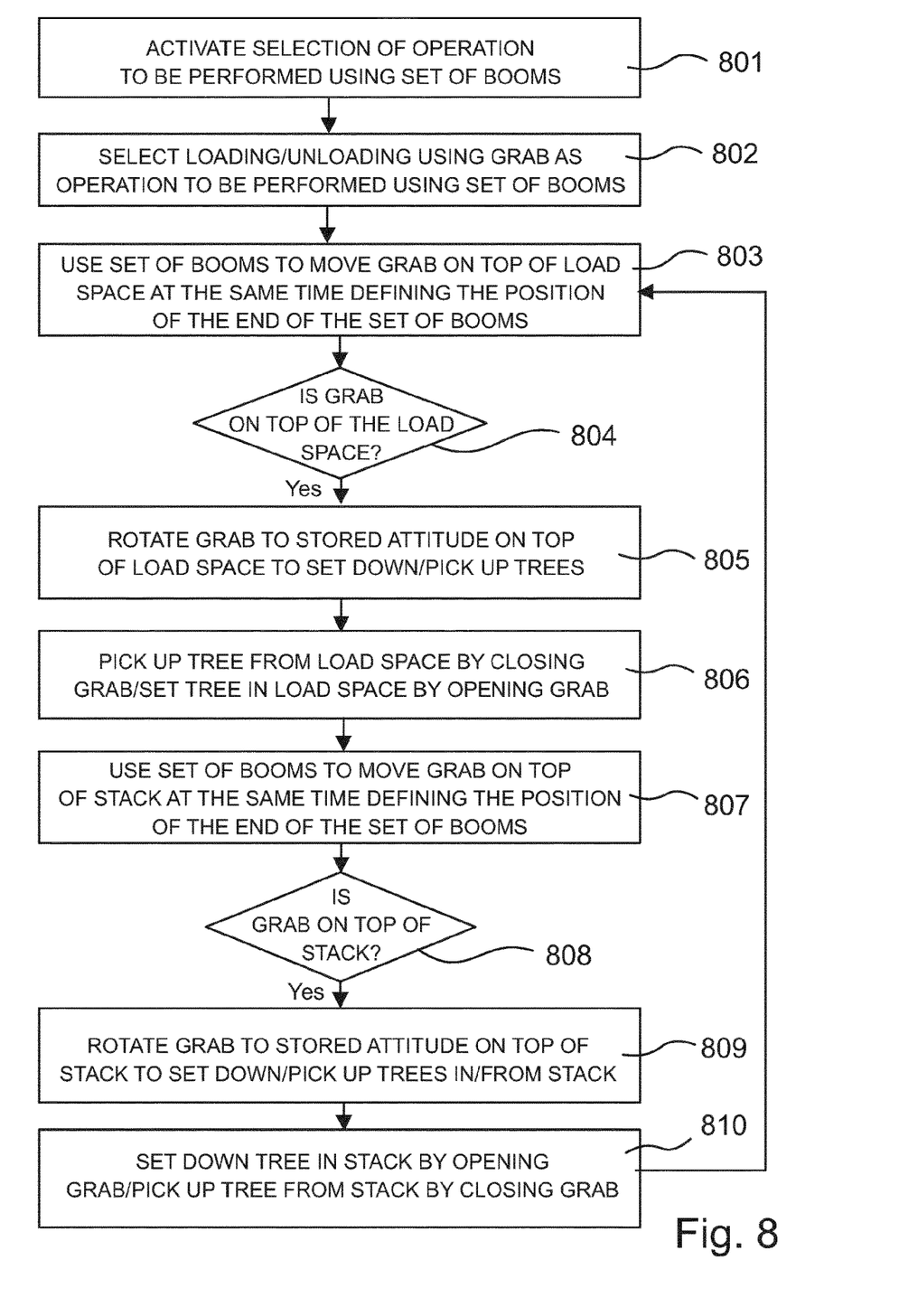
FIG. 8 shows a flow diagram of an example of the method when operating the wood-handling device.

Various embodiments of the method for controlling the operation of a wood-handling device 14 in a work machine 10 are described with reference to FIGS. 2-8. FIGS. 2 and 3 show schematic top views of the stages of the method according to the invention and FIGS. 4 and 5 corresponding side views of the stages of the method shown in FIGS. 2 and 3 in one embodiment of the invention. FIGS. 6-8 show examples of the method as flow diagrams. The example of an embodiment shown here is the unloading of a load from the forwarder to a stack or the loading of the forwarder, in which trees 16 are moved from the stack (or heap) to the load space 27 of the forwarder. Thus the wood-handling device 14 used in the example is a grab 15 for handling trees 16 or other objects or moving then from one place to another.

Figure 4:
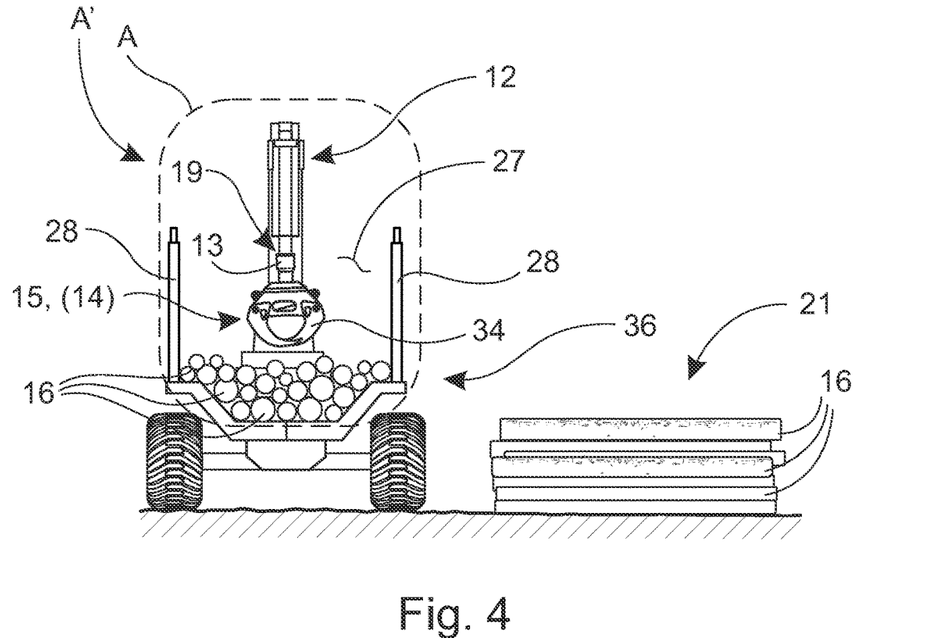
FIGS. 4 and 5 show a schematic side view of the stages of the method shown in FIGS. 2 and 3.
Figure 5:
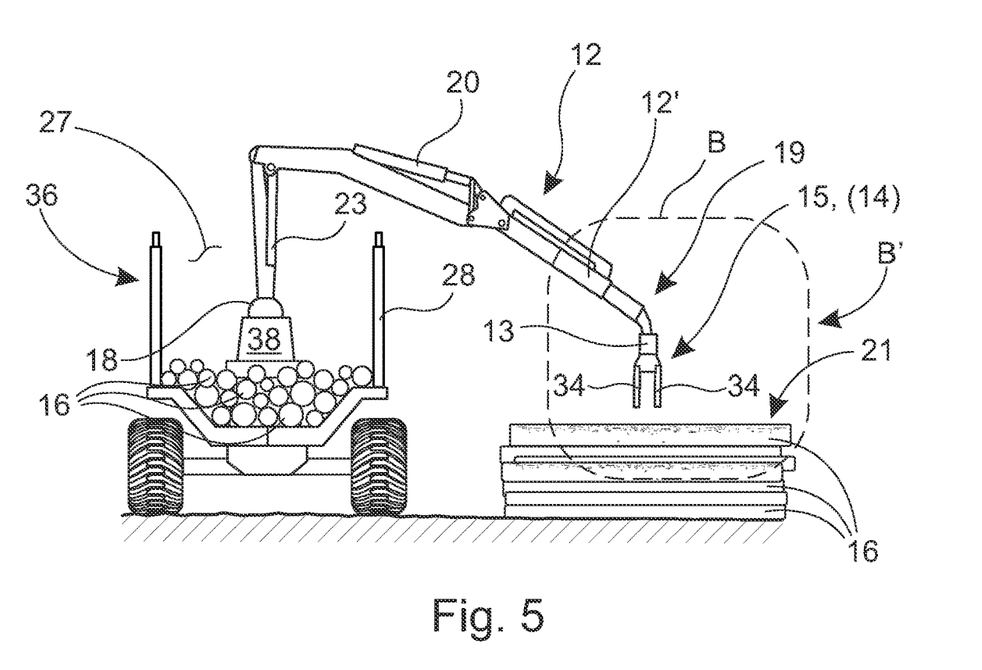

FIGS. 2 and 4 show the arrangement of the initial situation of the depiction of the method. According to one embodiment of the method, the work machine's 10 operator, i.e. in this case the forwarder's driver, performs the programming of the orientation of the wood-handling device 14 before performing work operations with it. FIG. 6 shows the flow-diagram example relating to this.

In stage 601, the programming of the orientation of the wood-handling device 14 is activated by the driver or activates automatically through the forwarder's control system 24.1. Activation can lead on the control system's 24.1 user interface to stage 602, from which it is then possible to further particularize the object of the programming of the orientation to be performed using the set of booms 12 according to the intended operation. In stage 602, loading/unloading of the forwarder using the grab 15 is selected as the operation to be performed. Thus, in the method the orientation of the wood-handling device 14 using the rotation device 13 can be said to be tied on the basis of the operation to be performed using the set of booms 12. In the case according to the example, the operation is the loading or unloading of the forwarder. In general, the operation is the use of the crane or working with the crane to move and handle goods or objects.

In stage 603, the grab 15 is moved by the set of booms 12 to on top of the load space 27. The work machine's 10 operator performs this move by controlling the set of booms 12. The grab 15 can then be above the load space 27 and also the load stakes 28. The grab 15 is guided to such a position on top of the load space 27 that it can be rotated and thus oriented freely by using the rotation device 13, even though there may be trees 16 in the grab 15.

In stage 604, the grab 15 is rotated on top of the load space 27 into an attitude for setting the trees 16 into the load space 27 or alternatively for picking the trees 16 out of the load space 27. The work machine's 10 operator performs this rotating movement too using the control system 24.1. The grab 15 is then oriented on top of the load space 27 in such a way that its jaws 34 open towards the load stakes 28 at both edges of the load space 27 and, for example, a tree 16 can also be picked from the load space 27 by the grab 15 when it is open. As stage 605 the orientation of the grab 15 in connection with the load space 27, now more particularly on top of it, is stored in the memory 24.3 of the control system 24.1 of the work machine 10. Storing is activated by the work machine's 10 driver. The angle-attitude data of the rotation device 13, defined using sensors, preferably data provided by an angle sensor on the angle attitude or orientation of the rotation device 13, is then stored in the memory 24.3 as input. In addition to the orientation of the grab 15, at the same time the position A of the end 19 of the set of booms 12 on top of the load space 27 is also stored in the memory 24.3. Then, for example the data provided by the sensors 17 of the operating devices 20, 23 of the set of booms 12, and/or the data provided by the sensors 17 defining the attitudes of the pivot angles of pivots of the set of booms 12 is stored as input in the memory 24.3. In addition, for example, the data provided by the angle sensor of the rotation device 18 of the set of booms 12 is also stored as input in the memory 24.3. The position A of the end 19 of the set of booms 12 also defines the position of the grab 15 for its orienting. If the end 19 of the set of booms 12 is here in the position A (on top of the load space 27) stored in the memory 24.3 of the work machine's 10 control system 24.1, the grab 15 is then known to be in connection with the load space 27 in such a way that it should be oriented in the manner stored in the memory 24.3 of the work machine's 10 control system 24.1.

In stage 606, the grab 15 is moved, using the set of booms 12, on top of the stack 21, or even more generally, into the area B of the stack 21. The work machine's 10 operator performs this transfer too by controlling the set of booms 12 through the control system 24.1. In stage 607, the grab 15 is oriented on top of or in the area of the stack 21 by rotating it to an attitude in which it is possible to set the trees 16 from the grab 15 to the stack 21 (or to the place in which the stack 21 will be formed) or alternatively to pick the trees 16 from the stack 21 into the grab 15. The work machine's 10 operator performs this grab 15 orienting rotation too through the work machine's 10 control system 24.1. The grab 15 is then oriented on top of the stack 21 in such a way that the opening of the grab's 15 jaws 34 takes place, i.e. the direction of movement of the jaws 34 is towards the outermost trees in the stack 21 and, for example, it is possible to use the grab 15 to pick up a tree 16 from the stack 21. In stage 608, the orientation of the grab 15 in connection with the stack 21, now particularly on top of it or in its area, is stored in the memory 24.3 of the work machine's 10 control system 24.1. Then the angle attitude data of the rotation device 13 defined by sensors 17, preferably the data provided by the angle sensor on the angle attitude or orientation of the rotation device 13, is one again stored as input in the memory 24.3. In addition to storing the orientation of the grab 15, at the same time the position B of the end 19 of the set of booms 12, which defines the position of the grab 15 in connection with the stack 21, is also stored. The data provided from the sensors 17 of the operating devices 20, 23 of the set of booms 12 and from the angle sensor of the rotation device 18 of the set of booms 12, for example, are then stored as input in the memory 24.3. If the end 19 of the set of booms 12 is here in the position stored in the memory 24.3 of the work machine's 10 control system 24.1, i.e. in the area B of the stack 21, it is then known that the grab 15 is in connection with the stack 21 in such a way that it should be oriented in the manner stored in the memory 24.3 of the work machine's 10 control system 24.1. Programming is terminated in stage 609. As a result of the procedure, the orientation of the wood-handling device 14 is now tied to the position A, B of the end 19 of the set of booms 12.

FIG. 7 shows yet another embodiment for programming the orienting of the wood-handling device 14 for operation to be performed using the set of booms 12. In other ways this corresponds to the procedure shown in FIG. 6, but now also includes the storing of the path of movement of the set of booms 12. Stages 701-709 can correspond to stages 601-609 described in connection with FIG. 6. After stage 706, there can be stage 706', in which the set of booms' 12 path-of-movement data when the grab 15 is moved by the set of booms 12 from on top of the load space 27 to on top of or the area of the stack 21 is stored in the memory 24.3 of the work machine's 10 control system 24.1. Correspondingly, after stage 709 there can also be stage 709', in which the set of booms' 12 path-of-movement data when the grab 15 is moved by the set of booms 12 from on top of or from the area of the stack 21 to on top of the load space 27 is stored in the memory 24.3 of the work machine's 10 control system 24.1. Using this embodiment, the path of movement of the set of booms 12 between positions A, B can be automated in addition to the orientation of the wood-handling device 14 tied to the positions A, B of the end 19 of the set of booms 12. The path-of-movement data can include, for example, the attitude and rotation angle of the set of booms, the pivot angles of the booms belonging to the set of booms 12, the attitudes of the operating devices, such as hydraulic cylinders, belonging to the set of booms 12, and the position of the wood-handling device 14. The inputs formed by the sensoring are stored in the memory 24.3.

As a result of the flow diagrams of FIGS. 6 and 7, the orientation of the wood-handling device 14 is tied to the position of the end 19 of the set of booms 12 in one or more positions A, B of the end 19 of the set of booms 12. The tying has now been achieved by the actions of the work machine's 10 operator. Because the locations of the stack 21 and the work machine 10 relative to each other can vary greatly, owing to the method the work machine's 10 operator can program the orienting of the wood-handling device 14 flexibly and easily to suit each situation. On the other hand, the tying can of course also be set at least in some part in the control system 24.1 already during the manufacture of the work machine 10. This could be, for example, the position of the end 19 of the set of booms 12 inside the load space 27, when the orientation of the rotation device 13 is such that the attitude of the wood-handling device 14 is suitable for the handling and transfer of trees 16 being in the load space 27. The discharge/making of a load from a stack 21 remaining on the left-/right-hand side of the work machine is another example. The location of the work machine 10 relative to the stack 21 is, however, as set, principally in a standard form (the work machine 10 is at right-angles to the stack 21 in connection with its end). If the work machine 10 is at angle deviating from a right-angle relative to the stack 21, programming can then be performed by the work machine's 10 operator.

In the examples shown in FIGS. 6 and 7, the programming of the orientation of the wood-handling device 14 is performed by way of example in individual spatial points. One versed in the art will, however, understand that, instead of individual points, the orientation can also be tied to motion space, i.e. to the location between specific points, on other words, more generally, to the target area and/or target volume A'-C'. This can also be programmable by the driver. The rotation device 13 then rotates to a specific set attitude in a specific area of location of the end 19 of the set of booms 12, for example in the area of the load space 27, according the longitudinal direction of the trees 16 in the load space 27 thus being suitable for the handling and moving of the trees 16 in the load space 27, or correspondingly on top of the stack 21 according to the longitudinal direction of the trees 16 being in the stack 21 thus being suitable for the handling and moving of the trees 16 being in the stack 21. The orientation can also be tied to the limits of the load space 27, which are defined, for example, by the load stakes 28. The position at any moment of the end 19 of the set of booms 12 corresponds to a specific attitude of the booms and pivots belonging to the set of booms 12. The attitude at any moment of the end 19 of the set of booms 12 can be determined and defined, for example, relative to the work machine 10 (some specific structure), or also relative to the operation to be performed.

For its part, FIG. 8 shows a flow diagram of one embodiment, in which the programming and automatic orientations performed in FIGS. 6 and 7 are exploited in connection with the unloading and loading of the work machine 10, more generally in the operations performed using the set of booms 12. Thus, before the operation to be performed using the set of booms 12, the orientation of the wood-handling device 14 corresponding to the position A, B of the end 19 of the set of booms 12 is tied for the repetition of the operation to be performed using the set of booms 12 to at least two positions A, B of the end 19 of the set of booms 12, preferably by storing the orientation of the wood-handling device 14 in at least two positions A, B of the end 19 of the set of booms 12 in the memory 24.3 of the work machine's 10 control system 24.1.

The term operating position can also be used for the positions A, B. In the operating position, there is typically a need to orientate the wood-handling device 14, using the rotation device 13, in a specific manner required by and/or permitting the operation, in order to perform the operation using the wood-handling device 14. For example, an operation in connection with the stack or load space is picking up tree in the grab or placing them in the stack or load space. In addition to/instead of the end-point areas of the path of movement of the set of booms, the operation can also relate to an operation to be performed using the set of booms in the area of the path of movement, such as, for example, avoiding the load stakes in the loading operation. The operating position can be defined, for example, by using an operating point, by an operating area and/or operating volume forming or by delimiting by two or more operating points. The continuous reorientation of the wood-handling device 14 over the whole area of its path of movement is avoided by the orientation of the wood-handling device 14 taking place in the operating position.

In stage 801, the selection of the operation to be performed using the set of booms 12 is activated from the work machine's 10 control system 24.1. This activation can take place automatically with the aid of the control system 24.1 or by the driver's selection. Activation can lead, in the user interface of the control system 24.1, to stage 802, from which the object of the operation it is intended to be performed using the set of booms 12 can be defined more precisely. In stage 802, the operation to be performed using the set of booms 12 is set to be the loading/unloading of the forwarder using the grab 15. In the example in question precisely unloading is to be performed. Generally the operation to be performed using the set of booms 12 is work machine dependent. It is defined by the work to be performed using the set of booms 12 and the tool to be attached to the set of booms 12. Thus, this stage 802 is not critical in terms of the operation of the invention.

In stage 803, the grab 15 is moved by the set of booms 12 to on top of the load space 27 while at the same time defining, and mainly continuously, the position of the end 19 of the set of booms 12 when performing the operation with the set of booms 12. The movement is now performed by the work machine's 10 driver. In stage 804, the work machine's 10 control system 24.1 is used to check whether the grab 15 is on top of the area defined as the load space 27. If the work machine's 10 control system 24.1 detects that the end 19 of the set of booms 12, and thus also the grab 15 attached to it is on top of the load space 27 (in the area A), then in stage 805 the grab 15 is automatically rotated by the control system 24.1 of the work machine 10 on top of the load space 27 to an attitude pre-stored in the memory 24.3, in order to pick the trees 16 from the load space 27 (or to place the trees in the load space 27). Thus the wood-handling device 14 is oriented using the rotation device 13 on the basis of the position A of the end 19 of the set of booms 12, according to a stored, more generally, set tie. When unloading, the grab 15 is rotated in position A to an attitude, so that its opening movement takes place mainly in a perpendicular direction relative to the longitudinal direction of the trees 16 being in the load space 27. The opened grab 15 can then grab the trees in the load space 27 with its jaws 34. Correspondingly, when loading the trees 16 brought to the load space 27 by the grab 15 are rotated in position A by the grab 15 to be parallel to the longitudinal direction of the load space 27, i.e. of the work machine 10.

In stage 806, a tree 16 can be picked from the load space 27 by closing the grab 15 (or alternatively the tree 16 can be placed in the load space 27 by opening the grab 15). The opening or closing of the grab 15 can be performed by the work machine's 10 operator. In stage 807 the grab 15 is moved by the set of booms 12 to on top of the stack 21, again also defining at the same time the position of the end 19 of the set of booms 12 when performing the operation by means of the set of booms 12. The movement is now again performed by the work machine's 10 driver. In stage 808, the work machine's 10 control system 24.1 is used to check whether the grab 15 is on top of or in the area of the stack 21. If the work machine's 10 control system 24.1 detects that the end 19 of the set of booms 12 and thus also the grab 15 attached to it is on top of the stack 21 (in the area B), then in stage 809 the grab 15 is automatically rotated by the work machine's 10 control system 24.1 in top of the stack 21, i.e. in position B, to the attitude pre-stored in the memory 24.3, in order to use the grab 15 to place the trees 16 in the stack 21 (or to use the grab 15 to pick them from the stack 21). Thus, on the basis of the position B of the end 19 of the set of booms 12, the rotation device 13 is used to orientate the wood-handling device 14 according to the stored, more generally, set tie.

When unloading the forwarder, the trees 16 brought to the stack 21 by the grab 15 are rotated by the grab 15 to be parallel with the trees 16 already being in the stack 21, for example, on top of the stack 21. Correspondingly, when loading the forwarder, the grab 15 is rotated to an attitude in which the direction of opening of its jaws 34 is mainly perpendicular to the longitudinal direction of the trees 16 being in the stack 21. The grab 15 can then be used to grip the trees 16 being in the stack 21 with its jaws 34. According to one embodiment, in one of or both locations of the end 19 of the set of booms 12 the previous lifting can be used as a reference. The orientation of the wood-handling device 14 and the attitude data of the rotation device 13 are then stored, for example, during working, at a specific location to form a specific orientation. In connection with this, the orientation of the grab 15 can be stored, to which it can now be pre-oriented. Thus the orientation can be said to be also location-dependent. It can be defined as preset, or in real time as a changing area and/or sector of the set of booms 12 as the operation to be performed progresses.

In stage 810, the tree 16 is set in the stack 21 by opening the grab 15 (or alternatively the tree 16 is picked from the stack 21 by closing the grab 15). From here it is possible to move, for example, to stage 803 and continue the operation to be performed using the set of booms 12. Owing to the invention, the rotation device 13 can be rotated only when it is necessary, such as, for example, immediately before operation (picking up a tree) or when it is most advantageous, for example, in terms of energy consumption.

On the basis of the above, the orientation of the wood-handling device 14 performed using the rotation device 13 is tied to the operation to be performed using the set of booms 12. In the example, this operation was unloading and loading. In addition, the orientation of the wood-handling device 14 is tied to the position of the end 19 of the set of booms 12, which can also be defined as an area A, B, instead of an absolute location point. In the example, the positions were in connection with the load space 27 (on top of/in the area of) A, and in connection with the stack 21 (on top of/in the area of) B.

In the example shown in FIG. 8, the work machine's 10 driver operates the set of booms 12 and the work machine 10 operates the rotation device 13 automatically, according to the situation/location. According to a corresponding principle to that when the automatic orientation of the wood-handling device 14 was performed using the rotation device 13, to the flow diagram of FIG. 8 can also be arranged the repetition of the path of movement stored in the memory 24.3 for the set of booms 12 in the flow diagram shown in FIG. 7, when moving the wood-handling device 14 from the load space 27 to the stack 21 and vice versa. Thus, according to one embodiment, the control system 24.1 can also perform the transfer automatically, provided the path-of-movement data of the set of booms 12 is stored for repetition of the path of movement, or provided the end point of the path of movement is defined for the end 19 of the set of booms 12, to which the control system 24.1 guides the end 19 of the set of booms 12 together with the wood-handling device 14.

Thus, before the operation to be performed using the set of booms 12, the path-of-movement data of the operation to be performed by the set of booms 12 or the position data of the end 19 of the set of booms 12 is stored. The position of the end 19 of the set of booms 12 is known or can be computed, if the attitude of the booms and/or the pivots of the set of booms 12 is known. Here, the path-of-movement data is, for example, the guiding of one or more pivot angles to a target attitude, or the guiding of the rotation angle of the set of booms 12 to a target attitude, or, for example, the guiding of the operation devices of the set of booms 12 to a target attitude. It can then also be the storing of points of the path of movement, when the repetition is movement between the points. For example, the repetition of the path of movement can be running one or more pivot angles by repeating the stored path-of-movement data, which can be data on the control of the pivot angle. And in addition also when performing an operation using the set of booms 12 the position of the end 19 of the set of booms 12 is altered according to the stored path-of-movement data, or the position data of the end 19 of the set of booms 12. Once again, the position of the end 19 of the set of booms 12 is known or can be computed, if the attitude of the set of booms 12 and/or the pivots is known. The set of booms 12 is then moved principally automatically by the work machine's 10 control system 24.1 without essential user interaction and the rotation device 13 repeats the orientations set for it at the ends of the path of movement, or along the path of movement. This too facilitates the work of the work machine's 10 driver.

The position A, B, of the end 19 of the set of booms 12, to which the orientation of the wood-handling device 14 is tied, can be understood, for example, as a point group in the location space A'-C', for example, as a location volume. Thus the position A, B, C need not be a single fixed location point in the location space A'-C', instead limits can be defined for it. The limits can define a two-dimensional area, or even a three-dimensional space, such as is shown as one example of an embodiment in FIGS. 2-5. According to one embodiment, the work machine's 10 driver can define the location space A'-C', in which the orientation of the wood-handling device 14 is wished to be set. On the other hand, the location space A'-C' can, in the case of some position, for example, the load space 27 or the stack 21 or heap, be already preset in the work machine's 10 control system 24.1. In the case of a two- or three-dimensional area being the definer of the orientation of the wood-handling device 14 of the set of booms 12, the area can be defined in the case of the load space 27 as the area that is delimited by the load stakes and preferably also the volume of the load space 27 delimited by the bunks. In practice, however, it should be noted that the orientation of the wood-handling device 14, particularly if there is a tree in the grab 15, is performed above the load space 27, in order to avoid hitting the bunks when rotating the grab 15. In addition, in the case of, for example, a stack/heap, or correspondingly the load space 27, the area or volume can be defined to be delimited by specific co-ordinates in the set of movement co-ordinates of the path of movement of the set of booms 12. Another way to define the area is the distance of the border from a specific defined point.

The load space's 27 load stakes are structures that essentially define the bottom of the load space 27, being generally steel beams, which can be shaped in different ways to form the load space's 27 bottom and possibly partly the edges of the load space 27. Vertical load stakes 28 are attached to the bunks and define the height of the load space 27.

According to yet another embodiment, when performing an operation with the set of booms 12, it is possible at the same time to use sensor means 17 to observe the operating environment in order to detect obstacles 22 (FIGS. 2 and 3). The obstacles 22 can be in front of the set of booms 12, in front of the wood-handling device 14 attached to the end of the set of booms 12, and/or in front of the load in the wood-handling device 14. The sensor means 17 can be on the work machine 10, in its set of booms 12, in the rotation device 13, and/or in the wood-handling device 14. On the basis of the observation performed, the defined position of the end 19 of the set of booms 12, and the target point of the end 19 of the set of booms 12 a control signal can be created to control the operation of the rotation device 13 and/or to guide the end 19 of the set of booms 12 to the target position or point, while avoiding the detected obstacles 22. On the basis of the defined position of the end 19 of the set of booms 12 and the created control signal, the wood-handling device 14 can be oriented according to the tie, using the rotation device 13. It is then possible to avoid mainly automatically obstacles in the road of the operation to be performed using the set of booms 12.

The orientation of the grab 15 to position A, B of the end 19 of the set of booms 12 can be performed with or without a load 16 in the grab 15. For example, when unloading the work machine 10 the tying of the orientation can be done on top of the load space 27 without a load. Correspondingly, the tying of the orientation can be done on top of the stack 21 with a load. It is then possible to take account of obstacles 22 in the vicinity of the stack 21. The rotation direction of the rotation device 13 can also be taken into account here. The rotation direction can be arranged in such a way that the obstacles 22 will not interfere with operations, or the rotation direction can be arranged through the shortest rotation.

In addition, one embodiment of the method according to the invention is such that the attitude of the rotation device 13, and thus the orientation of the grab 15 is tied to be such in the vicinity of the vertical load stakes 28 that the grab 15 fits between the load stakes 28 into and out of the load space 27 when there is no load in the grab 15. The attitude of such a tie is the same as in the load space 27 for handling trees 16, i.e. the jaws 34 open transversely to the longitudinal direction of the load space 27, and thus also relative to the longitudinal direction of the tree trunks 16 of the load space 27. This accelerates moving to and from the load space 27 with the grab 15 empty (without trees), because the grab 15 can be taken between the load stakes 28 without the grab 15 being lifted over the load stakes 28 in the height direction.

According to yet another embodiment, when defining the position A, B of the end 19 of the set of booms 12, the horizontal rotation angle α of the set of booms 12 is defined from, for example, a rotation device 18. According to one embodiment, the orientation of the wood-handling device 14 can even be tied only to the rotation angle α of the set of booms 12.

In addition to the method, another object of the invention is an arrangement for controlling the operation of a wood-handling device 14 in a work machine 10. The arrangement, in the case of which reference is here made to FIG. 1, includes a set of booms 12 attached to the work machine 10, a wood-handling device 14 attached to the end 19 of the set of booms 12, sensor means 17, and control means 24.

The set of booms 12 includes operating devices 18, 20, 23 for the handling of trees 16 by the work machine 10. The operating devices 18, 20, 23 can be used to change the position of the end 19 of the set of booms 12. The operating devices now include a rotation device 18 of the set of booms 12 at the end of the set of booms 12 attached to the work machine 10, between the work machine 10 and the set of booms 12. It can be used to rotate the set of booms 12 horizontally. In addition, the operating devices include, in an as such known manner, operating devices 20, 23 attached between the booms by pivots, such as, for example, hydraulic cylinders. These can be used to change the position of the end 19 of the set of booms 12 horizontally and vertically. In the set of booms 12, there can be a telescopic part worked by an operating device (for example, in boom 12'). It also permits the position of the end 19 of the set of booms 12 to be changed horizontally and vertically. As such, the invention can be implemented using a set of booms 12 that is according to the prior art.

The wood-handling device 14 is attached to the end 19 of the set of booms 12 through a rotation device 13. By means of the rotation device 13 the desired orientation for an operation can be achieved for the wood-handling device 14. The rotation device 13 then rotates the wood-handling device 14 horizontally. The rotation device 13 can, too, be hydraulically operated.

In addition, the arrangement also includes sensor means 17 for determining the position A, B of the end 19 of the set of booms 12 and the orientation of the wood-handling device 14 relative to the work machine 10. The sensing 17 too can be, for example, sensing that is as such known from the prior art and is possibly already installed in the work machine 10, by means of which the invention can be implemented in the case of sensing. The sets of booms 12 of work machines, such as, for example, forest machines, can comprise sensing of the position, state of movement, and/or the orientation of the set of booms 12.

Perhaps the most usual manner is to install sensors measuring the pivot angle in the pivots of the booms. One part of the sensor (such as the body) is then attached essentially rigidly to one part of the boom and correspondingly the other part (such as the sensor's shaft or measurement element) is attached to the other boom part. The angle sensor can be preferably an absolute sensor in implementation and construction, or on the other hand alternatively a non-absolute sensor. An absolute sensor knows its position at any point in the movement area, with no need to run the boom to a zero point. A non-absolute sensor requires a zero point to be defined. In construction, the pivot-angle sensor can be, for example, a potentiometer, an optical or other kind of resolver, or, for instance, an inductive sensor or one based on the Hall-phenomenon. To improve resolution, the movement of the boom can be, if necessary, transmitted to the sensor, for example, with the aid of gearing, so that in a specific area of movement more measurements are created.

The outer boom, i.e. the so-called extender of the folding boom, i.e. its telescopic extension, moves linearly in the longitudinal direction of the folding boom. To measure the position of the extension can be used a position sensor fitted to in connection with, for example, a linear operating device, such as, preferably the hydraulic cylinder. Such a sensor can be, for example, a so-called magnetostrictive sensor arrangement, which consists of a measurement rod and a magnetic ring. The linear movement can also be sensed using, for example, a linear potentiometer or alternatively by using a sensor measuring the change/rotational movement of the angle, when the linear movement is first converted to a rotational movement.

For the definition of the angle attitude, it is possible to integrate angle sensing to the rotation device 13, i.e. the rotator, for example, by fitting to the part inside the rotator and rotating relative to the shackle gearing, and a sensor reading this gearing, such as, for example, an inductive sensor, which detects the toothing of the said gearing when the rotator rotates.

The matters referred to above can also be measured in an as such known manner using various inertia measurement units and devices, such as various MEMS sensors, in which an inclinometer and/or a gyroscope can be preferably constructed. In the inertia measurement unit, the inclinometer detects acceleration forces, including the earth's gravity, relative to at least one, preferably three axes perpendicular to each other. Such an inclinometer arrangement defines its momentary attitude very precisely relative to the earth's gravity. In addition, the gyroscope means of the inertia measurement unit defines the angular velocity and angular acceleration data of the movement/rotation. Such a gyroscope arrangement permits the definition of the state of movement of the object and these data can be utilized in the definition of the angle attitude and thus also control of the rotation device.

In addition, if the loader of the forwarder is fitted to the front carriage 35, i.e. on a different carriage to the load space 27, it is then necessary to also define the angle attitude or chassis-pivot attitude between the machine's carriages 35, 36, i.e. the angle to which the machine's chassis-steering pivot is rotated. It is then possible to define the position of the end of the set of booms located on the front carriage relative to the load space located on the rear carriage.

Further, the arrangement also includes control means 24 for tying the orientation of the wood-handling device 14 performed using the rotation device 13 on the basis of the operation performed using the set of booms 12 and orienting the wood-handling device 14 using the rotation device 13 according to the tie. The control means 24 can includes a control system 24.1 and a computer 24.2. The control system 24.1 can be controlled through the user interface, for example, by the action of the work machine's 10 driver.

In the arrangement, the control means 24 are arranged to tie the orienting of the wood-handling device 14 to the position of the end 19 of the set of booms 12. The position of the end 19 of the set of booms 12 and the orientation of the wood-handling device 14 are arranged to be defined by the sensor means 17 when performing an operation. The control means 24 are arranged to orientate the wood-handling device 14 using the rotation device 13 on the basis of the defined position of the end 19 of the set of booms 12, according to the said tie.

The control means 24 and the sensing 17 connected to them are arranged implement one or more part-stages and/or operations according to the method described above, in order to implement the invention.

The invention is described above in connection with unloading and loading. The grab 15 then includes jaws 34 arranged to open and close. The grab 15 is oriented using the rotation device 13, so that, in connection with (in the area of) the load space 27, the movement of the jaws 34 of the grab 15 when opening and closing takes place mainly on a perpendicular plane relative to the longitudinal direction of the trees 16 arranged to be fitted into load space 27. Correspondingly, in connection with a stack 21 or heap, the movement of the grab's 15 jaws 34 when opening and closing takes place mainly on a perpendicular plane relative to the longitudinal direction of the trees 16 arranged to be placed in the stack 21 or heap. Similarly, the invention can also be applied to harvester operation. It can then be utilized, for example, in felling trees and/or in sorting them into stacks. For example, in thinning felling, trees may be so densely on the plot that the orientation of the harvester when gripping a tree can be kept mainly the same in the case of several trees before it needs changing, if the work machine remains stationary. Then too advantages can be gained using the invention, as the orientation of the processor head stored once in the memory 24.3 can be exploited. The harvester head then turns towards the tree to be felled.

According to one embodiment of the invention, in addition to any of the aforementioned embodiments it is possible to create tying of the rotation device 13, relative to one or more positions of the end 19 of the set of booms 12, without moving the set of booms 12 or the end 19 of the set of booms 12. The said tying is then done with the aid of the control system 24.1 in such a way that the angle attitude of the rotation device and thus the orientation of the wood-handling device 14 are tied to specific location co-ordinates of the end 19 of the set of booms 12, or to a co-ordinate area, which are defined from the pivot angles/the attitudes of operating devices of the set of booms 12. The tying of the orientation of the wood-handling device 14 can then be implemented without operating the set of booms 12 at all. This has the advantage that, for instance, tying can be done without operating the set of booms 12 and also that then tying can done more rapidly or before starting work.

In addition, according to one embodiment, the invention can be applied in such a way that locations or areas are defined in the load space 27, preferably using sorting bunks, for the different types of tree/types of goods of a goods sorting method. For example, the definition of the location can take place according to the bundle lifted first, so that the same type of goods is loaded in the location in question. The control system 24.1 is told that, for example, this is fibre wood and it is lowered into the load space. This accelerates work by automating the loading and sorting of timber, and accelerates the work flow and minimizes errors.

In addition, it is possible to apply the described embodiments of the invention with defining, in harvester operation, a place in a specific location, for timber types to be cut, in addition to orienting the attitude of the rotation device. Then, for example, the location of the type of goods in the stack, according to the first tree, remains in the memory 24.3 of the control system 24.1 for working with the following trees.

This can also apply to the cutting of trees into fixed lengths, when it takes place into stacks. The harvester head then rotates the trunk to be cut parallel to the stack, which can be, for example, parallel to the machine or, in terminal felling, mainly at right angles to the access track, so that the direction of the trees in the stack will be mainly at right angles to the access track. In addition, the felling direction too can be taken into account. The top of the tree to be felled can then be positioned in the same direction in which the previous tree was felled. Here, for example, the previous felling can be used as a reference. This too can be location-dependent (for example, an area, or a sector of the crane 47). The felling direction of a tree can also be taken into account so that, for example, a tree is not felled on top of the work machine.

Above, the invention is described as an example, in which the orienting of the wood-handling device 14 for the load space 27, for example in connection with a forwarder, takes place only in connection with (on top of) the load space 27 and for a stack 21 or heap only in connection with (on top of) the stack 21 or heap. One skilled in the art will understand, however, that the orientation can also take place earlier, particularly when the grab 15 is without a load. Then, for example, when loading trees 16 onto the forwarder from a stack 21, the grab 15 can be oriented for the stack 21 already even in connection with the load space 27, even immediately when the trees loaded there have separated from the grab 15, and not only once the grab 15 has been taken on top of the stack 21 or heap. Correspondingly, for example, when unloading trees 16 from the forwarder to the stack 21 the grab 15 can be oriented for the load space 27 already even in connection with the stack 21, even immediately when the trees 16 set in the stack 21 separate from the grab 15, and not only once the grab 15 has been taken on top of the load space 27. In addition, these can also be assisted by the grab's 15 state data (i.e. is the grab open). Thus, the orientation of the wood-handling device 14 based on the definition of the position at the moment of the end 19 of the boom 12 can be understood in the context of the invention very widely in the case of the position in which the orientation of the wood-handling device 14 is performed. However, what is important is that, in the invention there is no need for laborious computation of the movement direction and/or speed of the end 19 of the set of booms 12, on the basis of which the wood-handling device 14 is principally continuously orientated, but instead control can be based on the defined absolute location data of the end 19 of the set of booms 12. This means that the software and its execution are light to implement.

Relating to the above, in known grabs or grapples there is generally no sensing of the state open/close. However, in harvester heads or in some other wood-processing grabs there may be. However, even though there is not separate sensoring, it is often possible through the machine's control system 24.1 to estimate, for example, the state of the grab 15 and/or otherwise detect, automatically through the control system's 24.1 signals, the work situation, work stage, or sub-stage thereof being carried out at any time. For example, the stages of unloading and loading can be detected automatically without separate sensoring.

Above, the rotation device 13 has been taught at least two attitudes—in the load space 27 and on top of the stack 21. Alternatively, the second attitude can also be a repetition of the last attitude, for example, on top of the stack 21, if the lifting of a trunk from the same place in the previous lifting is detected. Thus the programming of the orientation can even be in real time, i.e. updated as the operation progresses. The driver can also store the movement points using the machine's control system 24.1. A situation image of the object, in which the driver sets distance and height values as co-ordinate settings, of the operation can then be formed in the control system 24.1. Here, it is also possible to exploit virtual reality or augmented reality.

The programming and the automation of operation of the rotation device 13 can be implemented with the grab 15 empty or with a tree 16 in the grab 15. When a tree 16 is in the grab 15, safety can also be taken into account, so that the tree can be rotated safely without striking, for example, the cab 37, the machine, the load space, and preferably external obstacles 22.

Relating to the above, according to one embodiment an area C (safety area) can be arranged to be around/near to the cab 37. In the area of influence of area C, the crane's 47 grab 15 is arranged to rotate the trunks 16 to be transversely, i.e. in such a way that ends of the trunks 16 do not point towards the cab 37. This reduces the danger that the crane 47 may aim the trunks 16 through the cab 37 window and inside it. Thus, in the embodiment too, the orientation of the wood-handling device 14, i.e. the grapple, is tied to the position of the end 19 of the set of booms 12, which can, according to one embodiment, form, for example, a point group in a position space C' (FIGS. 2 and 3), such as, for example, the position space around the cab 37.

In the invention, cameras can also be utilized and, for example, with their aid machine vision can be implemented in different ways. With the aid of machine vision, it is possible, for example, to see through which the tree is rotated, so that it will not strike anything. The tree can then be rotated for the load space, and in addition set there in a suitable place, preferably to achieve even loading, or, for example, for division according to tree types according to CTL harvesting. The tree 16 can be rotated parallel to the stack 21 and can even be guided on top of the stack 21. With the aid of machine vision/a camera, it is also possible to identify tree bundles, their location/number, the types of goods, and the dimensions, size, and orientation of the tree. As a result, a tree can be rotated through the shortest route to the correct attitude, obstacles in the path of the rotation detected, and rotation stopped if there are obstacles in the road. Further, using a camera/machine vision the boom can also be moved automatically. The machine can identify a stack 21, take the grab 15 to the stack 21, rotate to the correct attitude, grip a tree, take it to the load space—and begin to seek the next tree, preferably from the most recent location. The control system 24.1 controlling the forwarder or other wood-handling machine can also be able to automatically identify different work stages, so that the orientation of the work machine can be tied to them.

Further, one object of the invention is a forest machine 100, which includes the aforementioned arrangement or which is arranged to implement one or more of the part-stages and/or operations according to the method described above.

The invention also relates to a computer software product for controlling the operation of a wood-handling device 14 in a work machine 10. The product comprises program-code means stored on a media/storage device readable by computer 24.2, which program-code means are arranged to perform any at all of the steps according to the method described above, when the program is run on the computer 24.2. In addition, the invention also relates to an apparatus, which contains a memory unit for storing the program code and a processor for performing the program code. When operating, the apparatus implements at least one of the stages according to the method described above. Here, the apparatus can be understood to be a computer 24.2.

It should be understood that the above description and the accompanying figures are only intended to illustrate the present invention. The invention is thus not restricted to only the embodiments described above or defined in the Claims, instead many different variations and adaptations of the invention, which are possible within the scope of the inventive idea defined in the accompanying Claims, will be obvious to one skilled in the art.

The invention claimed is:

1. A method for controlling an operation of a wood-handling device in a work machine, which wood-handling device is attached through a rotation device to an end of a set of booms of the work machine to create a desired orientation of the wood-handling device for the operation, the method comprising the steps of:
   tying the orientation of the wood-handling device performed using the rotation device on the basis of the operation to be performed using the set of booms and the position of the end of the set of booms;
   defining the position of the end of the set of booms while performing the operation; and
   orienting the wood-handling device using the rotation device according to the tying step.

2. The method according to claim 1, further comprising tying the orientation of the wood-handling device corresponding to the position of the end of the set of booms, for a repetition of the operation to be performed, using the set of booms in at least two positions of the end of the set of booms.

3. The method according to claim 2, further comprising tying the orientation of the wood-handling device corresponding to the position of the end of the set of booms, for the repetition of the operation to be performed, using the set of booms in at least two positions of the end of the set of booms, by recording the orientation of the wood-handling device in at least two positions of the end of the set of booms in a memory of the work machine's control system.

4. The method according to claim 1, further comprising storing path-of-movement data of the operation to be performed using the set of booms or the position data of the end of the set of booms, and when performing the operation using the set of booms, changing the position of the end of the set of booms according to the stored path-of-movement data or the position data of the end of the set of booms.

5. The method according to claim 2, wherein the steps are performed before the operation to be performed using the set of booms.

6. The method according to claim 4, wherein the steps are performed before the operation to be performed using the set of booms.

7. The method according to claim 1, further comprising tying the orientation of the wood-handling device to the position of the end of the set of booms, which forms a point group in a location space.

8. The method according to claim 7, further comprising tying the orientation of the wood-handling device to the position of the end of the set of booms, which forms a location volume in a location space.

9. The method according to claim 1, wherein the wood-handling device is a grab for handling trees or other objects or moving them from one place to another.

10. The method according to claim 9, further comprising tying the orientation of the grab to the position of the end of the set of booms when the grab is without a load.

11. The method according to claim 9, further comprising tying the orientation of the grab to the position of the end of the set of booms when there is a load in the grab.

12. The method according to claim 1, wherein
   when defining the position of the end of the set of booms, defining rotation angle of the set of booms; and
   tying the orientation of the wood-handling device to the rotation angle of the set of booms.

13. The method according to claim 1, wherein
   when performing an operation using the set of booms, using a sensor to observe the operating environment to detect obstacles;
   creating a control signal, on the basis of the observation of the sensor, the defined position of the end of the set of booms, and the target point of the end of the set of booms, to guide the operation of the rotation device and/or the end of the set of booms to the target position or point, while avoiding the detected obstacles and orienting the wood-handling device, on the basis of the defined position of the end of the set of booms and the created control signal, by the rotation device according to the tying step.

14. The method according to claim 9, wherein the grab comprises jaws arranged to open and close, and further comprising orienting the grab using the rotation device so that in connection with a load space, the movement of the grab's jaws, when opening and closing, takes place mainly on a plane perpendicular to a longitudinal direction of the trees to be arranged into the load space.

15. The method according to claim 9, wherein the grab comprises jaws arranged to open and close, and further comprising orienting the grab using the rotation device, so that in connection with a stack or heap, a movement of the jaws of the grab, when opening and closing, takes place on a plane perpendicular to a longitudinal direction of the trees to be arranged in the stack or heap.

16. An arrangement for controlling an operation of a wood-handling device in a work machine, comprising:
    a set of booms attached to the work machine;
    operating devices for handling of trees by the work machine, arranged to change a position of an end of the set of booms;
    a rotation device;
    a wood-handling device attached to an end of the set of booms through the rotation device for creating a desired orientation in the wood-handling device for the operation;
    a position determining sensor to determine the position of the end of the set of booms and the orientation of the wood-handling device relative to the work machine when performing the operation; and
    a control means for tying the orientation of the wood-handling device performed using the rotation device on the basis of the operation to be performed using the set of booms and the position of the end of the set of booms and for orienting the wood-handling device using the rotation device according to the tying.

17. The arrangement according to claim 16, wherein the control means is operative for: tying the orientation of the wood-handling device performed using the rotation device on the basis of the operation to be performed using the set of booms and the position of the end of the set of booms; defining the position of the end of the set of booms while performing the operation; and orienting the wood-handling device using the rotation device according to the tying step.

18. A forest machine, wherein the forest machine comprises an arrangement according to claim 16.

19. A forest machine, wherein the forest machine is arranged to implement a method according to claim 1.

20. A computer software product for controlling an operation of a wood-handling device in a work machine, wherein the product comprises program-code means stored on a computer-readable media/storage device, which program-code means are arranged to perform at least some of the steps according to claim 1, when the program is run on a computer.

21. An apparatus, comprising a memory unit for storing program code and a processor for performing the program code, wherein when performing the apparatus implements at least some of the steps according to claim 1.

* * * * *